(12) United States Patent
Chahwan et al.

(10) Patent No.: US 9,274,966 B1
(45) Date of Patent: Mar. 1, 2016

(54) DYNAMICALLY THROTTLING HOST COMMANDS TO DISK DRIVES

(71) Applicant: Western Digital Technologies, Inc., Irvine, CA (US)

(72) Inventors: Alain Chahwan, Irvine, CA (US); Jonathan V. Nguyen, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 312 days.

(21) Appl. No.: 13/772,295

(22) Filed: Feb. 20, 2013

(51) Int. Cl.
*G06F 12/08* (2006.01)
*G06F 15/80* (2006.01)

(52) U.S. Cl.
CPC ........ *G06F 12/0866* (2013.01); *G06F 12/0802* (2013.01); *G06F 12/0868* (2013.01); *G06F 15/8069* (2013.01)

(58) Field of Classification Search
None
See application file for complete search history.

(56) References Cited

U.S. PATENT DOCUMENTS

| | | | |
|---|---|---|---|
| 6,058,466 A * | 5/2000 | Panwar et al. | 712/15 |
| 6,189,080 B1 * | 2/2001 | Ofer | G06F 12/0866 711/167 |
| 6,240,502 B1 * | 5/2001 | Panwar et al. | 712/15 |
| 6,856,556 B1 | 2/2005 | Hajeck | |
| 6,986,019 B1 * | 1/2006 | Bagashev et al. | 711/217 |
| 7,126,857 B2 | 10/2006 | Hajeck | |
| 7,249,268 B2 * | 7/2007 | Bhandarkar | 713/320 |
| 7,411,757 B2 * | 8/2008 | Chu et al. | 360/69 |
| 7,430,136 B2 | 9/2008 | Merry, Jr. et al. | |
| 7,447,807 B1 | 11/2008 | Merry et al. | |
| 7,477,477 B2 | 1/2009 | Maruchi et al. | |
| 7,502,256 B2 | 3/2009 | Merry, Jr. et al. | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,243,525 B1 | 8/2012 | Kan | |

(Continued)

*Primary Examiner* — Edward Dudek, Jr.
*Assistant Examiner* — Christopher D Birkhimer

(57) ABSTRACT

Example implementations described herein are related to methods for dynamically throttling host commands (up or down) to disk drives that include cache memory and rotating media, based on environmental conditions and/or drain rate from the cache memory to the rotating media, to provide consistent throughput for extended periods of time, and to avoid dramatic swings in performance from the pre-saturation state to the post-saturation state. The example implementations may be further extended to dynamically throttling host commands to devices that have HDD and SSD portions.

24 Claims, 11 Drawing Sheets

(56) References Cited

U.S. PATENT DOCUMENTS

| | | |
|---|---|---|
| 8,254,172 B1 | 8/2012 | Kan |
| 8,261,012 B2 | 9/2012 | Kan |
| 8,271,692 B1 | 9/2012 | Dinh et al. |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2005/0171753 A1* | 8/2005 | Rosing et al. ............... 703/18 |
| 2008/0024899 A1* | 1/2008 | Chu et al. ................. 360/69 |
| 2008/0141063 A1* | 6/2008 | Ridgeway et al. ............ 713/501 |
| 2008/0209103 A1* | 8/2008 | Haga ...................... 711/100 |
| 2009/0049312 A1* | 2/2009 | Min ....................... 713/300 |
| 2010/0174849 A1 | 7/2010 | Walston et al. |
| 2010/0185820 A1* | 7/2010 | Hughes et al. ............. 711/135 |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

\* cited by examiner

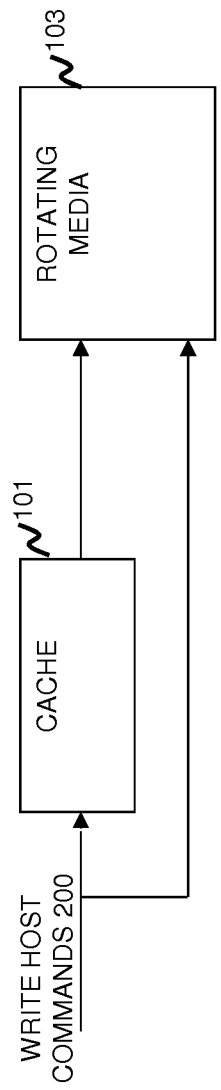
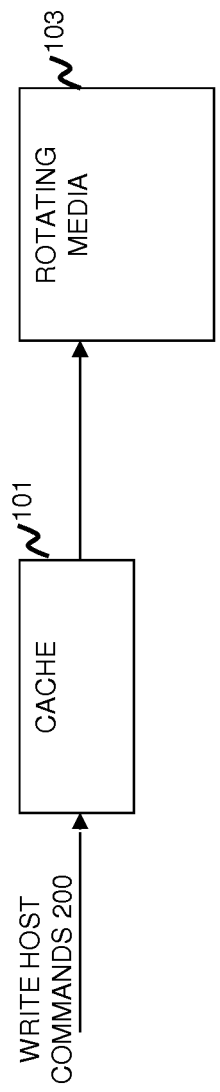
FIG. 1(a)
FIG. 1(b)

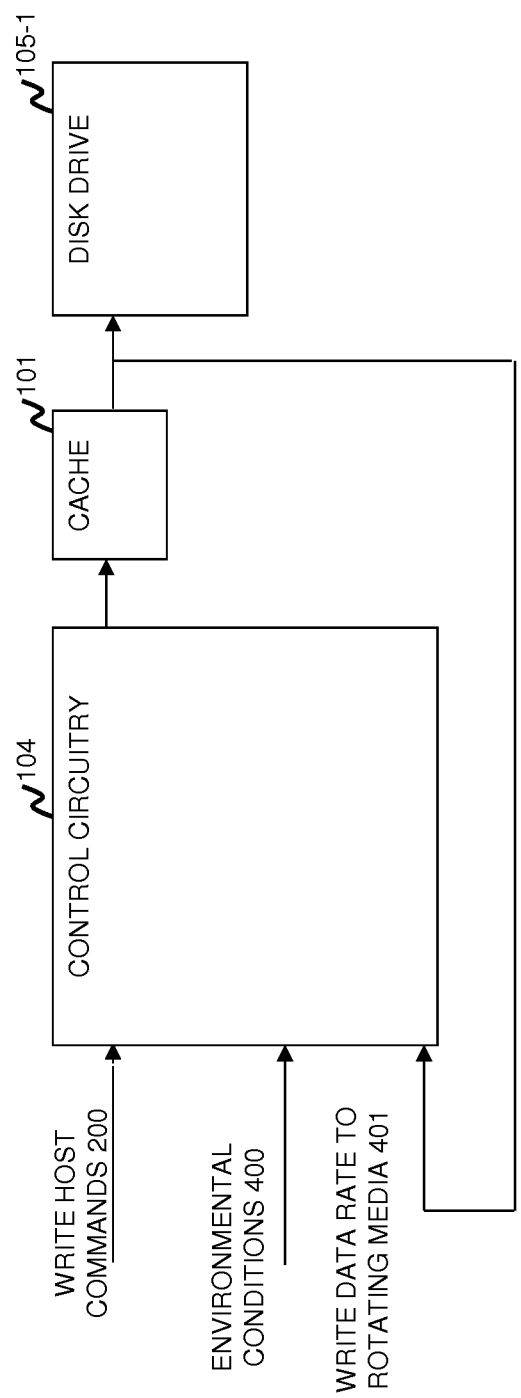

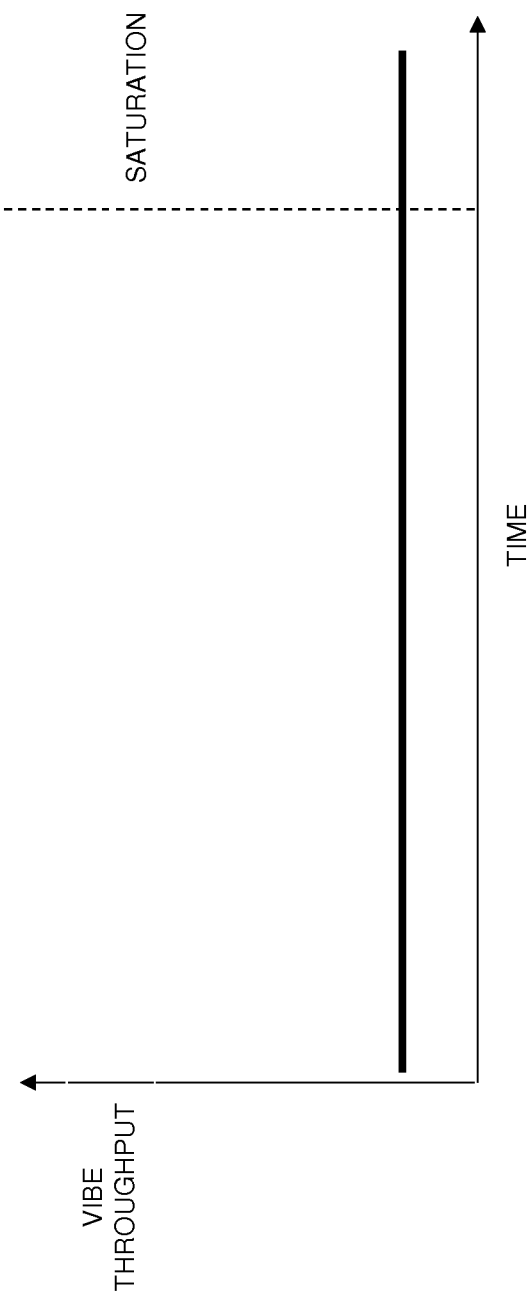

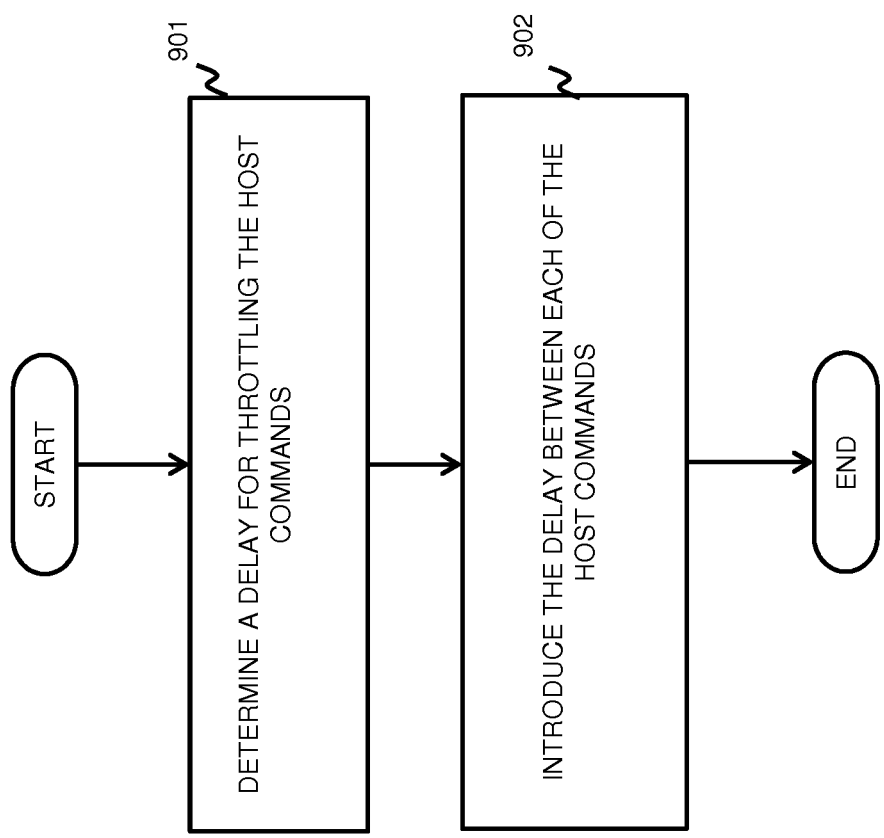

DYNAMICALLY THROTTLING HOST COMMANDS TO DISK DRIVES

BACKGROUND

1. Technical Field

Methods and example implementations described herein are generally directed to disk drives, and more specifically, to throttling host commands to disk drives.

2. Related Art

New schemes are being evaluated for using the cache memory of a disk drive or a solid state disk (SSD) portion of a device, to mitigate vibration and other issues seen by the rotating media of the disk drive, or a hard disk drive (HDD) portion of the device.

One of the schemes is to direct all new host write commands to the cache when the disk drive or device is subjected to different environmental conditions. For example, under persistent vibration conditions, draining of data from the cache/SSD portion to rotating media/HDD portion is much slower resulting in saturation (i.e., filling) of the cache. Once the cache saturates, performance will drop dramatically as the disk drive or device is thereby limited to the write capability of the HDD portion/rotating media under vibration, which is often very limited. Such conditions may induce inconsistent swings in performance over time.

FIGS. 1(a) and 1(b) illustrate example related art operation flows during a non-vibration mode operation and a vibration mode operation, respectively. As illustrated in FIG. 1(a), write host commands 200 are transmitted to both the cache 101 and the rotating media 103 of a disk drive when the disk drive is not undergoing adverse vibration conditions. As illustrated in FIG. 1(b), when the disk drive undergoes adverse vibration conditions, the write host commands 200 are sent only to the cache 101, which is drained to the rotating media 103. Because the rate of writing to the cache can greatly exceed the rate of writing to the rotating media (which is typically very low during vibrations), prolonged operation of sending the write commands only to the cache 101 will eventually result in cache saturation. The same situation can also take place in a device with an HDD portion and an SSD portion used as a cache to the HDD portion.

FIG. 2 illustrates an example vibration throughput plot for the example operation flow of FIG. 1(b). As illustrated in FIG. 2, the throughput during vibration mode operation may remain adequate, as shown at 300, until the cache becomes saturated, whereupon the throughput performance may decrease drastically, as shown at 301. The likelihood of the cache becoming saturated may increase significantly when the device or disk drive operates under vibration mode over an extended period of time. Cache saturation may eventually lead to the disk drive or device not being able to timely process data access commands, which in turn may cause an operating system of the host to hang or go into an unrecoverable error state.

BRIEF DESCRIPTION OF THE DRAWINGS

FIGS. 1(a) and 1(b) illustrate example related art operation flows during a non-vibration mode operation and a vibration mode operation, respectively.

FIGS. 4(a) and 4(b) illustrate example operation flows in accordance with example embodiments.

FIG. 5 is a plot illustrating an example of data throughput under vibration for the example operation flow of FIG. 4.

FIG. 9 is a flow diagram illustrating a control circuitry introducing a delay to throttle host commands, in accordance with an example embodiment.

DETAILED DESCRIPTION

Some example embodiments of the present inventive concept are related to methods for dynamically throttling host commands (up or down) to disk drives that include cache memory and rotating media based on environmental conditions and/or drain rate from the cache memory to the rotating media, to provide consistent throughput for an extended period of time and to avoid dramatic swings in performance from pre-saturation state to post-saturation state. Some embodiments are related to dynamically throttling host commands to devices that have HDD and SSD portions.

Figure 3A:
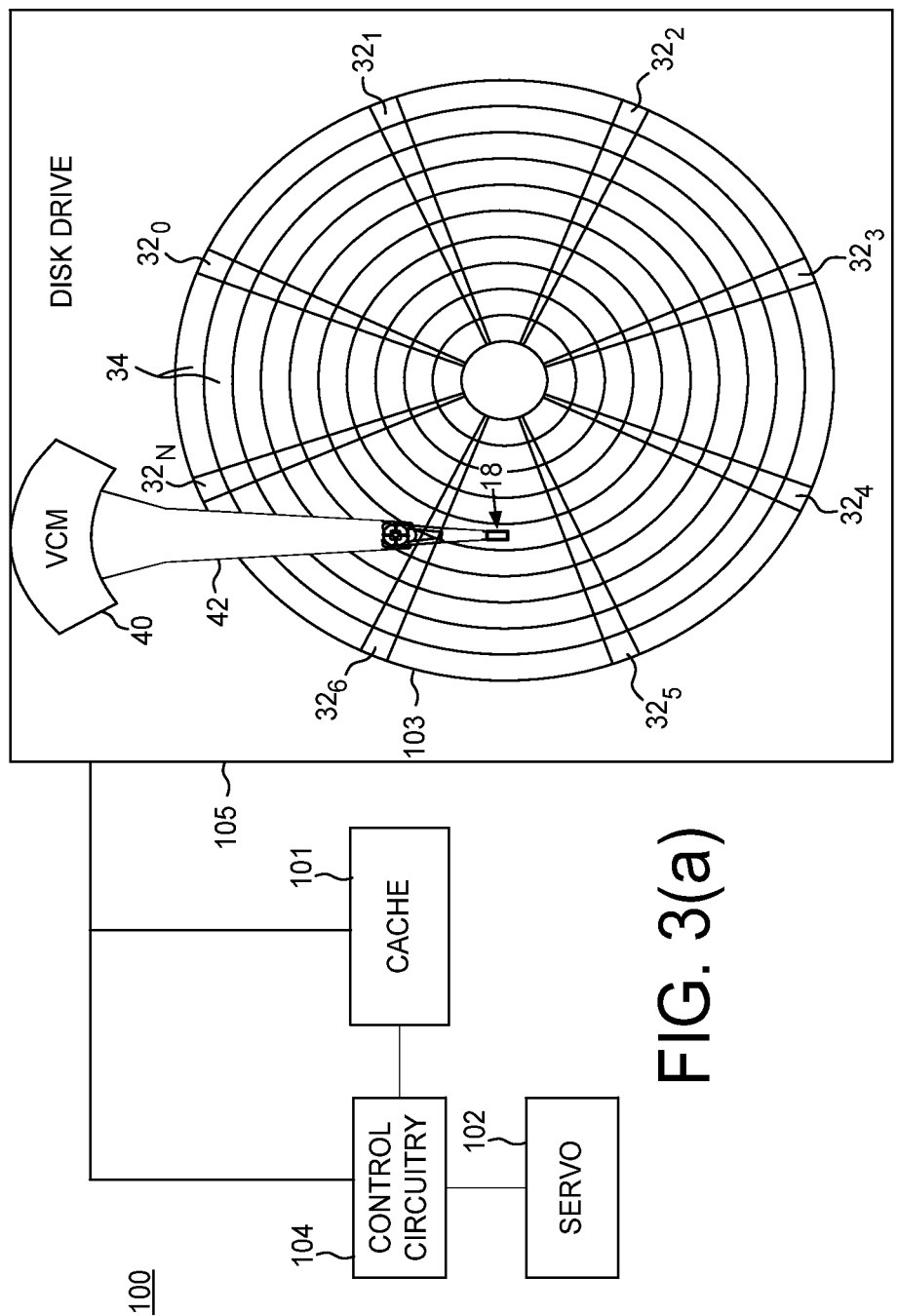
FIGS. 3(a) and 3(b) illustrate example configurations for a device and a disk drive, in accordance with example embodiments.

FIG. 3(a) illustrates an example configuration of a device 100, in accordance with an example embodiment. The device 100 may include a disk drive 105, control circuitry 104, cache memory 101, and a servo 102. The disk drive 105 may include rotating media 103 which may include embedded servo sectors $32_0$-$32_N$ that define a plurality of servo tracks 34. The device 100 may be a computing device, a data storage device such as a network attached storage device, etc. A voice coil motor (VCM) 40 rotates an actuator arm 42 about a pivot to actuate a head 18 radially over the rotating media 103 to perform read and write operations. The control circuitry 104 is configured to throttle host commands based on at least one of a rate at which data is being drained from the cache memory 101 to the rotating media 103, and at least one environmental condition. The control circuitry 104 may be disposed externally from the disk drive 105, for example, but not limited to, on a motherboard for the device 100, etc., or may be disposed in the disk drive 105. The cache memory 101, which may include non-volatile semiconductor memory (NVSM) or an SSD, may also be disposed externally from the disk drive 105, for example, but not limited to, on a motherboard for the device 100, etc., or may be a part of the disk drive 105. One or more servos 102 and/or sensors (not shown) may be employed to provide information, such as various environmental conditions (e.g., vibration, moisture, temperature, etc.), to the control circuitry 104.

Figure 3B:
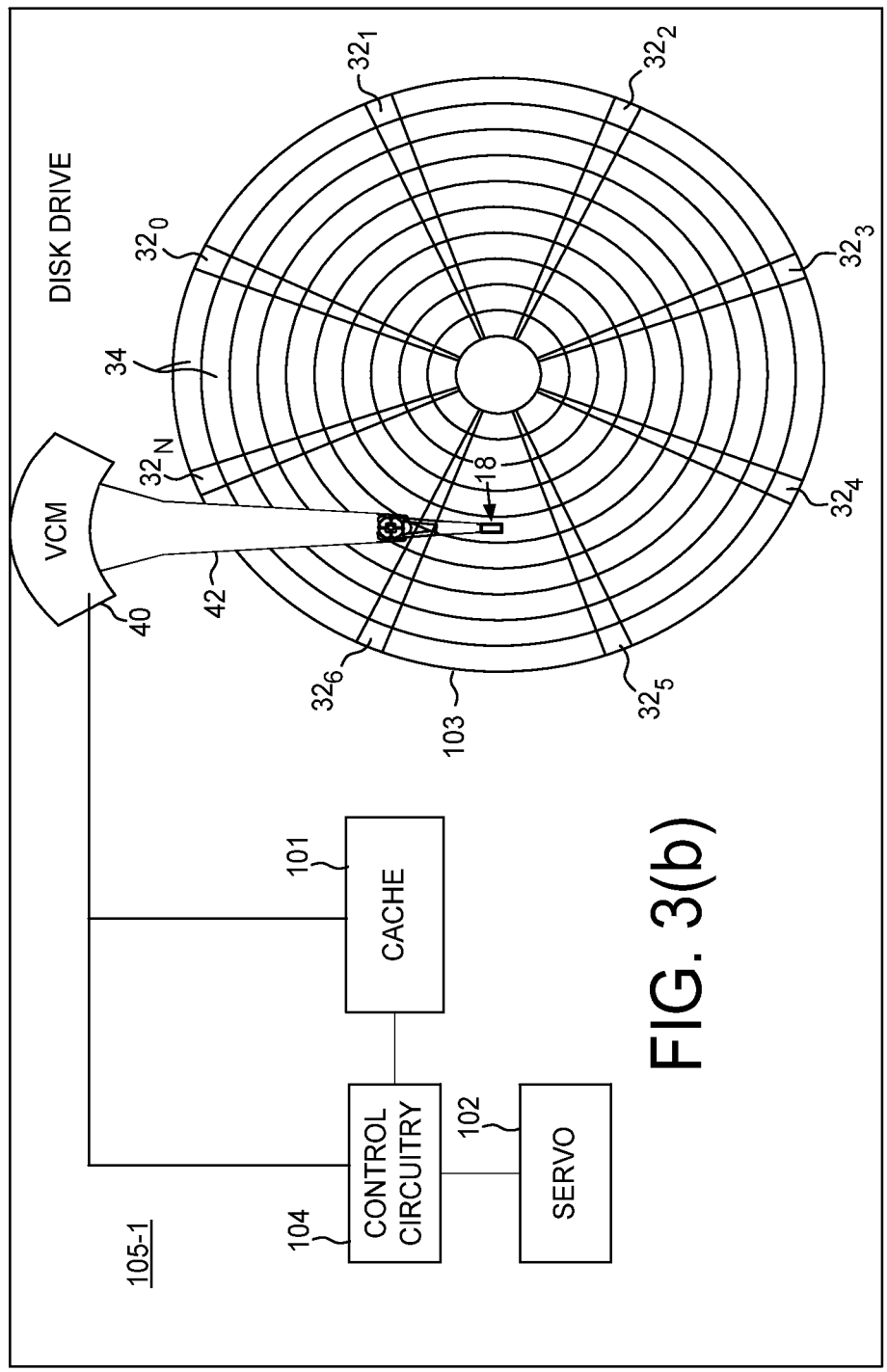

In another example configuration, FIG. 3(b) illustrates an example of a disk drive 105-1, which may involve a configuration wherein the control circuitry 104, the cache memory 101 and the servo 102 are part of the disk drive 105-1. The disk drive 105-1 may also include one or more sensors so that one or more servos 102 and/or sensors (not shown) may be employed to provide information, such as various environmental conditions (e.g., vibration, moisture, temperature, etc.), to the control circuitry 104. For example, in a hybrid disk drive configuration, the cache memory 101 may include an SSD or NVSM.

Figure 4A:
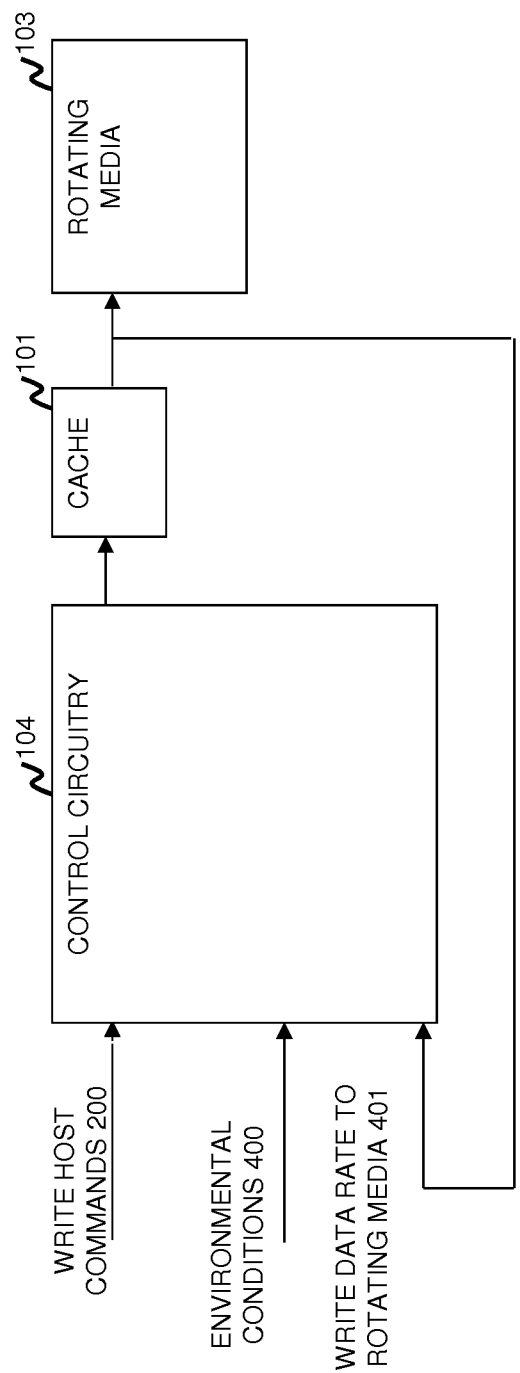

FIGS. 4(*a*) and 4(*b*) illustrate example operation flows in accordance with example embodiments. In the operation flow of FIG. 4(*a*), the control circuitry 104 controls the rate at which the write host commands 200 are forwarded to the cache 101, and may additionally monitor or receive information regarding one or more environmental conditions 400 and/or the rate 401 at which data is being drained from the cache 101 to the rotating media 103. FIG. 4(*b*) illustrates another similar operation flow for a device 100 utilizing a disk drive 105-1.

The one or more environmental conditions 400 may include conditions such as vibration, temperature, moisture, or other conditions that may affect the performance of the disk drive or device. In an example embodiment, the control circuitry can receive information regarding the vibration condition of the disk drive 105-1 or device 100. The information regarding the vibration condition may include a vibration mode categorization (e.g., nominal vibration, low vibration, vibration, extreme vibration, etc.) detected by the servo 102 and/or sensor(s), or as determined by the control circuitry 104. Each vibration mode categorization may represent a predefined vibration threshold based on a desired implementation. Depending on the vibration mode or measurement, the control circuitry 104 can choose to throttle the host commands, for example, but not limited to, reducing or increasing the rate of the write host commands being forwarded to cache memory 101, introducing or removing delays between each write host command to be forwarded to the cache, etc.

Other implementations of the present inventive concept may be configured for other desired environmental conditions. For example, temperature for the device 100 or disk drive 105-1 may be monitored, and various modes of categorization may be implemented to represent various temperature thresholds. In adverse temperature modes (e.g., high heat, etc.), where throughput may degrade due to prolonged use, the control circuitry 104 may throttle the rate of the host commands being sent to the cache memory downwards. Other environmental conditions, such as moisture, battery life, etc. may be detected in a similar fashion by the servo 102 and/or sensors, or as determined by the control circuitry 104.

The rate 401 at which data is being drained from the cache memory 101 to the rotating media 103 can also be monitored by the control circuitry 104. For example, if the rate 401 falls below a minimum throughput threshold, the control circuitry 104 may determine to throttle the host commands upwards, thereby increasing the rate of host commands to the cache memory 101. The minimum throughput threshold can be predetermined (e.g. factory preset, etc.) or set/adjusted by the control circuitry, or determined by other methods. In another example embodiment, if there are no adverse environmental conditions, the control circuitry 104 may determine that the disk drive does not need to be restricted to the minimum throughput threshold, and may throttle the host commands upwards. Further example implementations are provided below in the descriptions of FIGS. 6-9.

Figure 2:
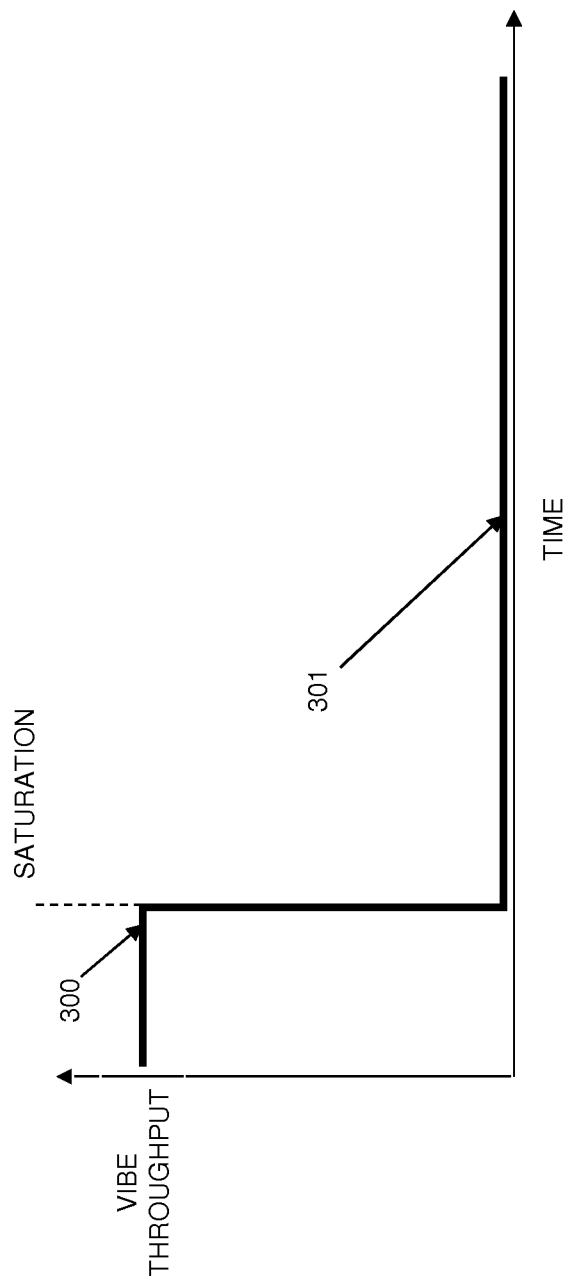
FIG. 2 is a plot illustrating an example of data throughput under vibration for the example operation flow of FIG. 1(b).

FIG. 5 is a plot illustrating an example of data throughput under vibration for the example operation flow of FIG. 4. In an example implementation, the throttling of host commands during adverse vibration conditions thereby leads to consistent performance when writing to the cache, which subsequently avoids cache saturation, mitigating the risk of the disk drive or device becoming unable to timely service host commands. Compared to FIG. 2, where no throttling is performed, FIG. 5 shows a rationed or measured use of the total available throughput under a vibration condition. This may be preferable in many ways. First, although performance is lower initially as compared to state 300 shown in FIG. 2 (a relatively short period of time), the throttled approach avoids cache saturation for a longer period of time. Indeed, as many vibration conditions are temporary, the throttled approach provides a greater chance that the vibration conditions would pass without cache saturation. Second, the longer period of saturation avoidance allows for possible warning signal(s) to be sent and action(s) to be taken. For example, in one embodiment the disk drive or device under such constant vibration may send a warning signal to the host to anticipate potential problems, which may allow the host to take actions to avoid entering into an error state.

It is to be noted that although FIG. 5 shows one throttling state, the rate of throttling may vary in practice due to varying environmental conditions and/or drain rate observed, as described further below.

FIGS. 6-9 illustrate example flow diagrams for the control circuitry, in accordance with example embodiments of the present inventive concept.

Figure 6:
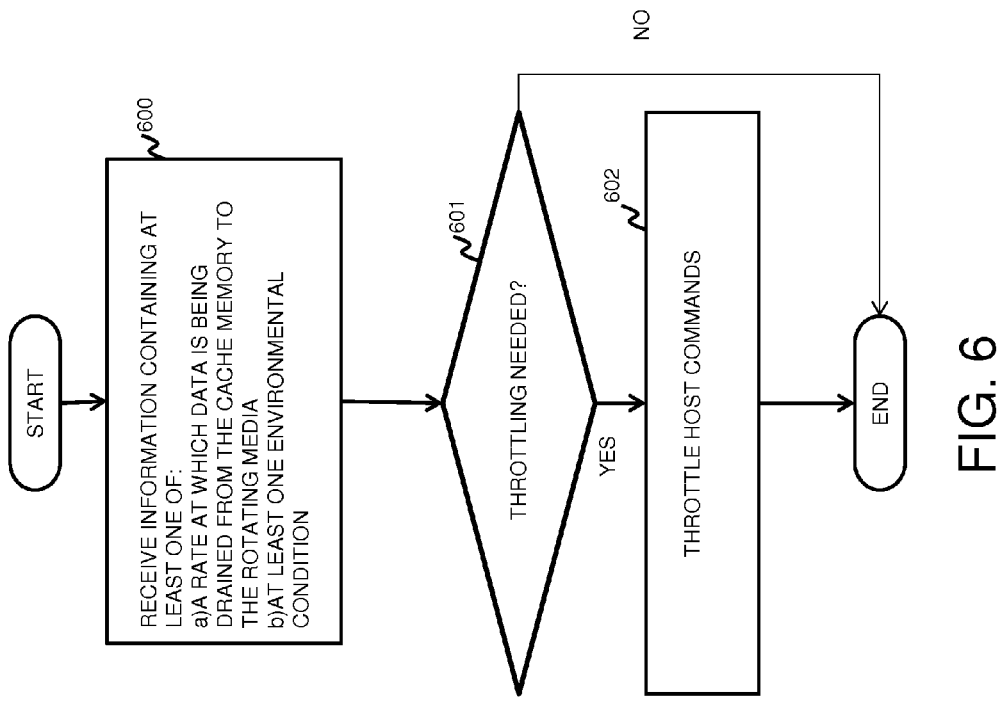
FIG. 6 is a flow diagram illustrating a control circuitry throttling host commands based on receiving information containing at least one of a rate at which data is being drained and at least one environmental condition, in accordance with an example embodiment.

In the example embodiment of FIG. 6, the control circuitry receives information containing at least one of a rate at which data is being drained from the cache memory to the rotating media, and at least one environmental condition (600). The control circuitry can determine if throttling is needed based on the information received (601). If the control circuitry determines that throttling is needed (601—Yes), then the control circuitry can proceed to throttle the host commands (602).

In this example embodiment, the control circuitry can thereby receive information in an ad-hoc manner and determine the throttling decision accordingly. For example, information for the at least one environmental condition may not necessarily need to be sent to the control circuitry unless there is a status change (e.g., mode change for one or more environmental conditions). In that situation, the control circuitry may determine that the disk drive does not need to be restricted to the minimum throughput threshold, and may throttle the host commands upwards to maximize throughput, in the absence of any adverse environmental conditions.

Similarly, the control circuitry may determine from one or more adverse environmental conditions (e.g., extreme vibration, extreme temperature, etc.) to immediately throttle the host commands downwards, and subsequently monitor the drain rate to ensure that the minimum throughput threshold is met. The control circuitry may also determine from the drain rate (e.g., quickly falling drain rate, drain rate below minimum throughput threshold, etc.) to immediately throttle the host commands upwards or downwards appropriately, regardless of the environmental conditions. Other configurations based on the example embodiment of FIG. 6 are also possible.

Figure 7:
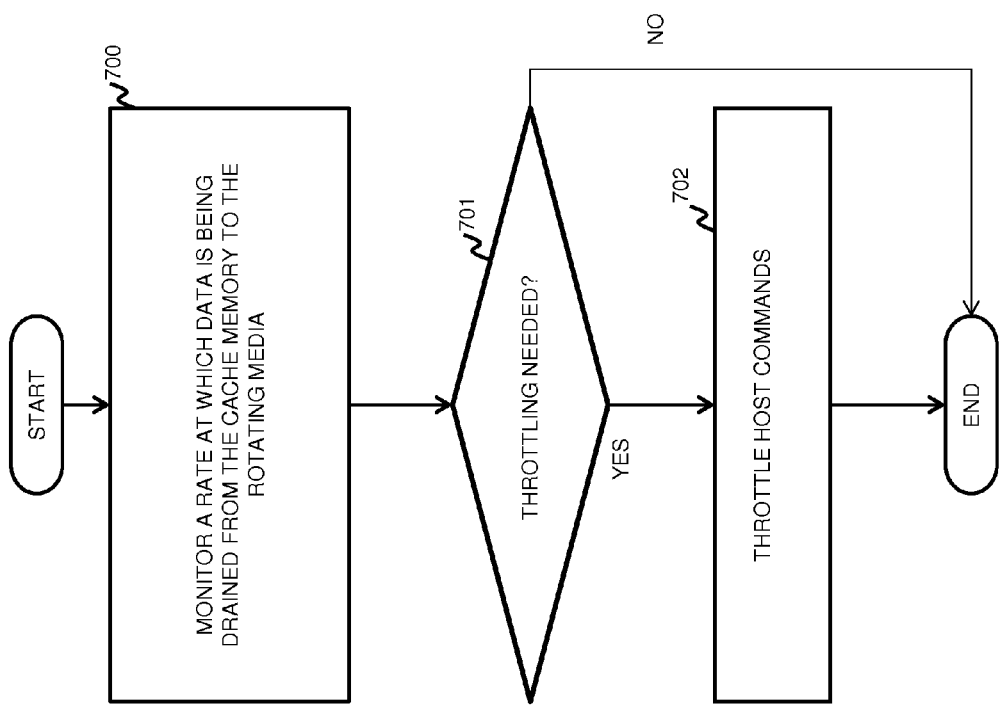
FIG. 7 is a flow diagram illustrating a control circuitry throttling host commands based on monitoring a rate at which data is being drained, in accordance with an example embodiment.

In the example embodiment of FIG. 7, the control circuitry monitors the rate at which data is being drained from the cache memory to the rotating media, without monitoring environmental conditions (700). The example embodiment of FIG. 7 may be utilized in situations such as, but not limited to, a server or a desktop. The control circuitry determines if throttling is needed based on the rate alone (701). If the control circuitry determines that throttling is needed (701—Yes), then the control circuitry can proceed to throttle the host commands (702).

The example embodiment of FIG. 7 controls to meet or exceed a minimum throughput requirement of the device or disk drive. For example, if the control circuitry determines that the rate is declining quickly, the control circuitry may decide to throttle the host commands downwards to avoid having the rate fall below the minimum throughput requirement. Similarly, the control circuitry may decide to throttle the host commands upwards to increase the throughput as needed to avoid falling below the minimum throughput requirement. The control circuitry can be configured to throttle the host commands upwards or downwards in various situations based on the monitored rate.

Figure 8:
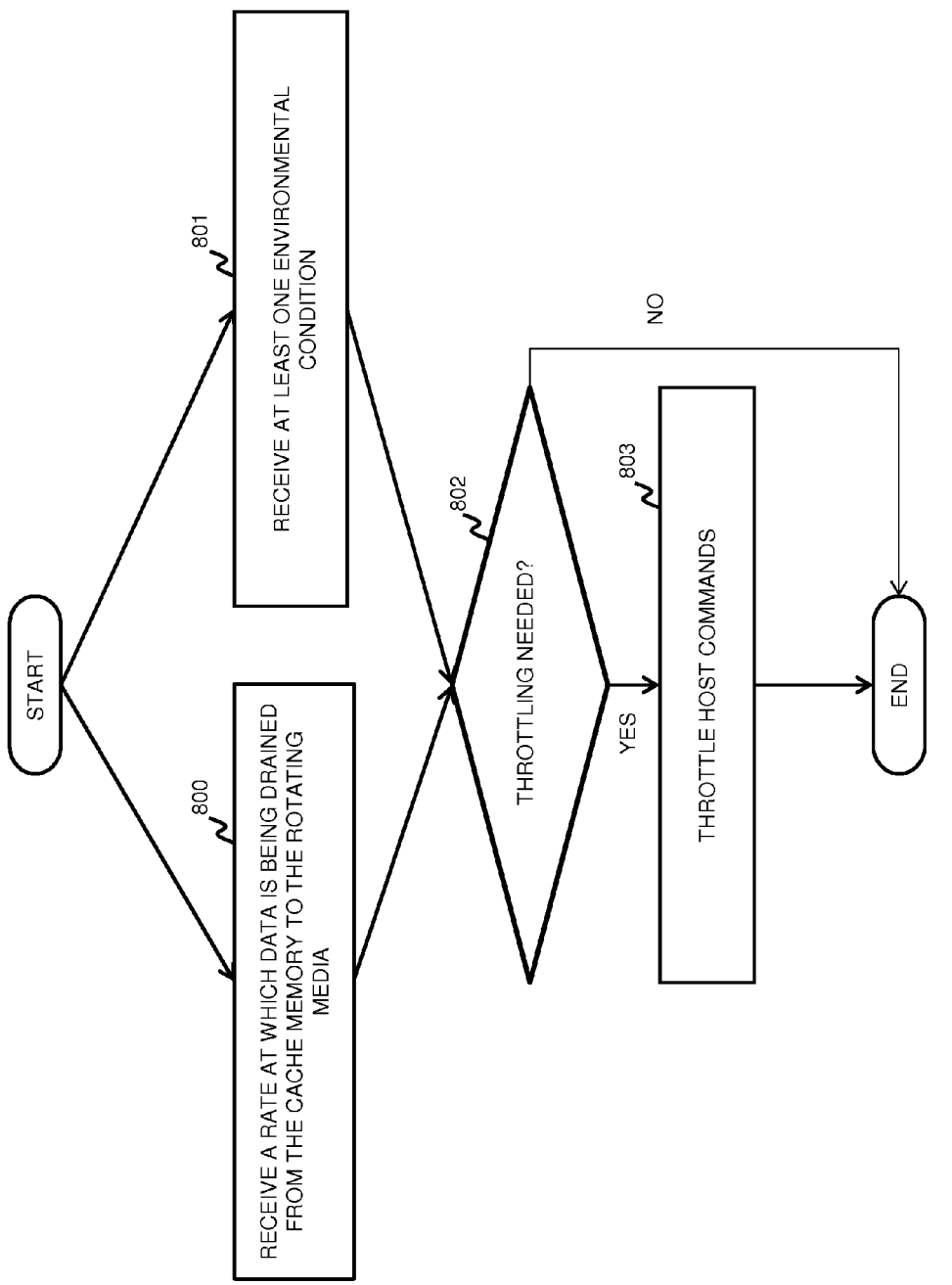
FIG. 8 is a flow diagram illustrating a control circuitry throttling host commands based on monitoring the rate at which data is being drained and at least one environmental condition, in accordance with an example embodiment.

In the example embodiment of FIG. 8, the control circuitry receives information regarding a rate at which data is being drained from the cache memory to the rotating media (800), and at least one environmental condition (801). In this example embodiment, the control circuitry may constantly monitor both the environmental conditions and the drain rate before determining a throttling decision. The control circuitry determines if throttling is needed based on the information received (802). If the control circuitry determines that throttling is needed (802—Yes), then the control circuitry can proceed to throttle the host commands (803). The example embodiment of FIG. 8 may be used for devices that may undergo an extreme range of adverse but otherwise temporary conditions (e.g., tablets, laptops, etc.) so that the device does not needlessly throttle the host commands from a temporarily adverse environmental condition alone.

The throttling of the host commands may be implemented in various ways. In an example embodiment of FIG. 9, the throttling of host commands is performed by introducing a delay between each of the host commands being sent to the cache memory. After a determination is made that throttling needs to be conducted, the control circuitry determines a delay for throttling the host commands (901). For example, if the determination is made that the host commands should be throttled upwards, the delay may be decreased. Conversely, the delay can also be increased if the determination is made that the host commands should be throttled downwards. The control circuitry introduces the delay between each of the host commands as they are sent to the cache memory, or between groups or types of host commands, or at other times (902).

Any suitable control circuitry may be employed to implement the flow diagrams of the example embodiments noted above, for example, but not limited to, any suitable integrated circuit or circuits. For example, the control circuitry may be implemented within a read channel integrated circuit, or in a component separate from the read channel, such as a disk controller, or certain steps described above may be performed by a read channel and others by a disk controller. In one example, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one example, the control circuitry may take the form of a microprocessor executing instructions, the instructions being operable to cause the microprocessor to execute in accordance with the flow diagrams described above. The instructions may be stored in any computer-readable storage medium, which may involve tangible media such as flash memory, RAM, etc. Alternatively, the instructions may be stored in a computer-readable signal medium, which involves non-tangible media such as carrier waves. In one example, they may be stored on a non-volatile semiconductor memory external to the microprocessor, or integrated with the microprocessor in a SOC. In another example, the instructions are stored on the disk and read into a volatile semiconductor memory when the disk drive or device is powered on. In yet another example, the control circuitry comprises suitable logic circuitry, such as state machine circuitry.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A disk drive, comprising:
    rotating media;
    cache memory; and
    control circuitry configured to throttle a rate of host commands by introducing a delay between each of the host commands sent from a host based on a minimum throughput requirement of the cache memory and information comprising at least one of:
        a rate at which data is being drained from the cache memory to the rotating media; and
        at least one environmental condition;
    wherein the delay is increased in response to a decline in the rate at which data is being drained from the cache memory while the rate at which data is being drained from the cache memory is at or above the minimum throughput requirement, and the delay is decreased for the rate at which data is being drained from the cache memory falling below the minimum throughput requirement of the cache memory.

2. The disk drive of claim 1, wherein the control circuitry is further configured to determine a vibration mode for the disk drive, and wherein the at least one environmental condition comprises the determined vibration mode.

3. The disk drive of claim 1, wherein the control circuitry is further configured to monitor the rate at which data is being drained from the cache memory to the rotating media and to determine the delay based at least in part on the rate at which data is drained from the cache memory.

4. The disk drive of claim 1, wherein the information comprises the rate at which the data is being drained from the cache memory to the rotating media, and the at least one environmental condition.

5. The disk drive of claim 1, wherein the disk drive is a hybrid disk drive, and wherein the cache memory is a non-volatile semiconductor memory (NVSM) cache.

6. The disk drive of claim 1, wherein the delay is decreased for an absence of the at least one environmental condition.

7. The disk drive of claim 1, wherein the at least one environmental condition comprises vibration, wherein the delay is increased in response to detection of vibration of the disk drive.

8. The disk drive of claim 1, wherein the at least one environmental condition comprises a plurality of modes of detected vibration of the disk drive, each of the plurality of modes representing a different vibration threshold, wherein the delay is increased in response to a change from a first mode of the plurality of modes to a second mode of the plurality of modes, the second mode having a higher threshold than the first mode.

9. The disk drive of claim 1, wherein the at least one environmental condition comprises a plurality of modes of detected vibration of the disk drive, each of the plurality of modes representing a different vibration threshold, wherein the delay is decreased in response to a change from a first mode of the plurality of modes to a second mode of the plurality of modes, the second mode having a lower threshold than the first mode.

10. A method, comprising:
  receiving information comprising at least one of:
    a rate at which data is being drained from a cache memory in a disk drive to a rotating media in a disk drive; and
    at least one environmental condition of the disk drive;
  determining a throttling decision from the received information; and
  throttling a rate of host commands sent from a host and received by the disk drive based on the throttling decision by introducing a delay between each of the host commands based on the information and a minimum throughput requirement of the cache memory, the delay being increased in response to a decline in the rate at which data is being drained from the cache memory while the rate at which data is being drained from the cache memory is at or above the minimum throughput requirement, and the delay being decreased for the rate at which data is being drained from the cache memory falling below the minimum throughput requirement of the cache memory.

11. The method of claim 10, wherein the at least one environmental condition comprises a vibration mode of the disk drive.

12. The method of claim 10, further comprising monitoring the rate at which the data is being drained from the cache memory in the disk drive to the rotating media in the disk drive, and determining the delay based at least in part on the rate at which the data is being drained from the cache memory.

13. The method of claim 10, wherein the information comprises the rate at which the data is being drained from the cache memory in the disk drive to the rotating media in the disk drive, and the at least one environmental condition.

14. The method of claim 10, wherein the disk drive is a hybrid disk drive, and wherein the cache memory is a non-volatile semiconductor memory (NVSM) cache.

15. A control circuitry configured to:
  receive information comprising at least one of:
    a rate at which data is being drained from a cache memory in a disk drive to a rotating media in the disk drive; and
    at least one environmental condition of the disk drive;
  determine a throttling decision from the received information; and
  throttle a rate of host commands sent from a host based on the throttling decision by introducing a delay between each of the host commands based on the information and a minimum throughput requirement of the cache memory, the delay being increased in response to a decline in the rate a rate at which data is being drained from the cache memory while the rate at which data is being drained from the cache memory is at or above the minimum throughput requirement, and the delay being decreased for the rate at which data is being drained from the cache memory falling below the minimum requirement of the cache memory.

16. The control circuitry of claim 15, wherein the at least one environmental condition comprises a vibration mode of the disk drive.

17. The control circuitry of claim 15, wherein the control circuitry is further configured to monitor the rate at which the data is being drained from the cache memory in the disk drive to the rotating media in the disk drive, and to determine the delay based at least in part on the rate at which the data is being drained from the cache.

18. The control circuitry of claim 15, wherein the information comprises the rate at which the data is being drained from the cache memory in the disk drive to the rotating media in the disk drive, and the at least one environmental condition.

19. A device, comprising:
  a disk drive;
  cache memory; and
  control circuitry configured to throttle a rate of host commands sent from a host by introducing a delay between each of the host commands based on a minimum throughput requirement of the cache memory and information comprising at least one of:
    a rate at which data is being drained from the cache memory to the disk drive; and
    at least one environmental condition;
  wherein the delay is increased in response to a decline in the rate at which data is being drained from the cache memory while the rate at which data is being drained from the cache memory is at or above the minimum throughput requirement, and the delay is decreased for the rate at which data is being drained from the cache memory falling below the minimum throughput requirement of the cache memory.

20. The device of claim 19, wherein the control circuitry is further configured to determine a vibration mode for the device, and wherein the at least one environmental condition comprises the determined vibration mode.

21. The device of claim 19, wherein the control circuitry is further configured to monitor the rate at which data is being drained from the cache memory to the disk drive and to determine the delay based at least in part on the rate at which data is being drained from the cache memory.

22. The device of claim 19, wherein the information comprises the rate at which the data is being drained from the cache memory to the disk drive, and the at least one environmental condition.

23. The device of claim 19, wherein the cache memory is disposed externally from the disk drive.

24. The device of claim 19, wherein the control circuitry is disposed externally from the disk drive.

* * * * *